US011935436B2

(12) United States Patent
Crawley et al.

(10) Patent No.: US 11,935,436 B2
(45) Date of Patent: Mar. 19, 2024

(54) SIGN MOUNTING FOR BARRIER POST

(71) Applicant: Tensator Group Ltd, Milton Keynes (GB)

(72) Inventors: Peter James Crawley, Milton Keynes (GB); Alan Robert McPherson, Milton Keynes (GB)

(73) Assignee: TENSATOR GROUP LTD (GB)

( * ) Notice: Subject to any disclaimer, the term of this patent is extended or adjusted under 35 U.S.C. 154(b) by 0 days.

(21) Appl. No.: 17/826,266

(22) Filed: May 27, 2022

(65) Prior Publication Data

US 2022/0383780 A1 Dec. 1, 2022

(30) Foreign Application Priority Data

May 28, 2021 (GB) ..................................... 2107710

(51) Int. Cl.
*G09F 7/18* (2006.01)
*E01F 13/02* (2006.01)

(52) U.S. Cl.
CPC .............. *G09F 7/18* (2013.01); *E01F 13/022* (2013.01); *G09F 2007/1804* (2013.01); *G09F 2007/1821* (2013.01)

(58) Field of Classification Search
CPC ............... G09F 7/18; G09F 2007/1821; G09F 15/0037; G09F 15/0062; G09F 2007/1804; G09F 2007/1886; G09F 7/10; E01F 13/022; E01F 9/669; E01F 13/02
See application file for complete search history.

(56) References Cited

U.S. PATENT DOCUMENTS 2,022,160 A * 11/1935 Sorensen .................. G09F 7/20
40/607.06
4,458,455 A * 7/1984 Tollstoff de Voss ...... E01F 9/65
D8/382
5,655,323 A * 8/1997 Lassoff ..................... G09F 7/08
40/661

(Continued)

FOREIGN PATENT DOCUMENTS

| | | | |
|---|---|---|---|
| CN | 206558133 | U | 10/2017 |
| GB | 2360995 | A | 10/2001 |
| GB | 2587417 | A | 3/2021 |

OTHER PUBLICATIONS

United Kingdom Search Report under Section 17, dated Nov. 26, 2021, issued in corresponding UK Application No. GB 2107710.2.

*Primary Examiner* — Cassandra Davis
(74) *Attorney, Agent, or Firm* — OSTROLENK FABER LLP

(57) ABSTRACT

A sign mounting for mounting a sign on top of a barrier post that includes a body having an inner side for positioning against a barrier post and an outer side for supporting a sign; and a mounting channel formed on the inner side of the body. The mounting channel allows the sign mounting to be mounted onto and supported by a spline of the barrier post. The mounting channel is open at a lower end and closed at an upper end and has a relatively narrow vertical opening at an inner side extending from the lower end to the upper end for a spline to extend through, and a relatively wider inner portion extending laterally beyond the opening on each side of the vertical opening within which a spline can be positioned. The sign mounting may form part of a mounting kit that includes a barrier post.

8 Claims, 5 Drawing Sheets

(56) References Cited

U.S. PATENT DOCUMENTS

| | | | | |
|---|---|---|---|---|
| 5,709,057 | A * | 1/1998 | Johnson, Jr. | E01F 9/65 52/27 |
| 8,291,629 | B2 * | 10/2012 | Silverstein | G09F 7/06 40/652 |
| 11,215,319 | B2 * | 1/2022 | Yang | F16M 11/041 |
| 2007/0256341 | A1 * | 11/2007 | McLaughlin | G09F 7/18 40/607.13 |

* cited by examiner

SIGN MOUNTING FOR BARRIER POST

CROSS-REFERENCE TO RELATED APPLICATION

The present application claims priority to United Kingdom Patent Application No. GB 2107710.2, filed May 28, 2021, the content of which is incorporated herein by reference.

FIELD OF THE INVENTION

The present invention relates to temporary or semi-permanent barrier posts, such as those used to form barriers in retail outlets and airports. In particular, the present invention relates to the provision of signs and advertising on such barrier posts.

BACKGROUND TO THE INVENTION

Barrier posts are commonly used as part of crowd control and queue management. For example, portable or fixed barrier posts are commonly used to control queues at airports and at retail outlets. In such locations, the barrier posts have one or more barrier members extending between the posts to direct a queue. Some such barrier members are extendable from the barrier post. Alternative barrier members are ropes or other flexible members that can be removably attached to the barrier posts. Further alternative barrier members are rigid members that are permanently or removably attached to the barrier posts. Most barrier posts either have one or more barrier member extending from an upper end or one or more means for mounting barrier posts formed at an upper end.

In order to provide information to people signs are commonly mounted on top of barrier posts. For example, signs giving information on the direction of queueing, the reasons for a queue, or advertising are mounted on top of barrier posts may be provided. This can be achieved in a variety of ways. One simple way of mounting signs on top of a post is to provide a frame, within which a sign can be inserted, at the upper end of a barrier post. Such frames are commonly formed of metal and allow a suitable printed card to be inserted into and removed therefrom. The frames usually sit at the top of a mounting that is permanently or removably attached to the upper end of the barrier post. Such frames are relatively simple to use but relatively expensive and, relatively fragile. Alternative means for positioning signs on top of barrier posts are also available but these tend to be more complex and expensive. Therefore, there is a need for a simpler and cheaper apparatus for mounting signs on top of barrier posts.

SUMMARY OF THE INVENTION

The present invention provides a sign mounting for a barrier post comprising:

- a body having an inner side for positioning against a barrier post and an outer side for supporting a sign; and
- a mounting channel formed on the inner side of the body; wherein,
- the mounting channel is open at a lower end and closed at an upper end and has:
- a relatively narrow vertical opening at an inner side extending from the lower end to the upper end for a spline to extend through;
- a relatively wider inner portion extending laterally beyond the opening on each side of the vertical opening within which a spline can be positioned.

The present invention is advantageous as it provides a simple mounting for signs that allow them to be mounted to the splines of barrier posts. In particular, the sign mounting can be positioned over, and mounted on, a spline of a cassette of a barrier post. In order to position the sign mounting on a spline the spline will be positioned in the mounting channel of the sign mounting such that the channel retains the sign mounting in position on the spline. As the channel is closed at its upper end the spline will be retained in the channel and the sign mounting will be held in position on the spline. The sign mounting can be positioned onto a spline by sliding the sign mounting downwards onto a spline and can be removed from a spline by sliding the sign mounting upwards off the spline.

There are no current apparatus for mounting signs on the splines of barrier posts. All current sign mountings on barrier posts involve mounting the sign on or over the top of a barrier post. The present inventiom is particularly advantageous in that it allows a sign to be securely mounted on the spline of a barrier post.

The sign mounting can be formed of any suitable material. In embodiments of the invention the sign mounting may be formed of a suitable polymer. This includes, but is not limited to, polypropylene or polycarbonate. In alternative embodiments of the invention the sign mounting may be formed of metal in any appropriate manner. For example the sign mounting may be machined from a block of metal.

A sign mounting according to the present invention may be formed in any suitable manner. In embodiments of the invention the sign mounting may be formed from a polymer as a unitary moulded body. This may be advantageous as it provides a robust construction that is cost-effective and long-lasting. The skilled person would be able to readily determine whether a sign mounting according to the present invention is formed as a unitary moulded body due to, for example, the presence of moulding lines on the sign mounting.

As will be readily appreciated the sign mounting of the present invention is intended and used for mounting a sign to a barrier post at or near an upper end of a barrier post, where a spline is located. The sign mounting may be mounted on a barrier post part-way up a barrier post if a spline is located at that point. The spline will engage with the sign mounting at the inner side of the sign mounting and thus the inner side of the sign mounting will be held adjacent the barrier post to which it is mounted. The sign mounting of the present invention may comprise a sign mounting means for holding a sign. A sign mounting means may be formed at any part of the sign mounting that is not held against a barrier post when the sign mounting is in use. A sign mounting means may comprise one or more of a slot, a clamp, an adhesive pad, a screw, a sucker, or any other suitable apparatus or fixing for attaching a sign to the sign mounting. The sign mounting means may permanently or removably attach a sign to the sign mounting.

In embodiments of the invention a sign mounting may be formed on an outer side of the body. Additionally or alternatively a sign mounting may be formed on an upper side of the body, on a lower side of the body, or on either or both lateral sides of the body.

In embodiments of the invention a sign mounting means may comprise an outwardly protruding bar for supporting a lower edge of a sign formed on an outer side of the sign mounting. An outwardly protruding bar may comprise a channel formed at or on an upper side, the channel being sized and shaped for positioning a lower edge of the sign therein.

A sign mounting according to the present invention may comprise one or more adhesive pads positioned on an outer side of the body for adhering to a sign to the sign mounting. Adhesive pads may be provided in addition to an outwardly protruding bar, as described above. If one or more adhesive pads are provided in addition to an outwardly protruding bar it may be advantageous that the one or more adhesive pads are positioned directly above the outwardly protruding bar, such that a lower edge of the sign may be supported by the outwardly protruding bar and an inner side of the sign is adhered to the sign mounting by means of the one or more adhesive pads.

The sign mounting of the present invention may be formed such that a sign mounted in or on the sign mounting is oriented parallel to an outer side of the sign mounting. In such embodiments it may be advantageous that the outer side of the body of the sign mounting is vertical such that the sign mounted in or on the sign mounting is held to be vertical. Alternatively, an outer side of the body may be angled between 10° and 20° away form vertical, either leaning towards or away from the inner side of the body. As will be readily appreciated the angle of the body may be chosen to orientate a sign in a preferred orientation.

In many embodiments of the invention the sign mounting may be formed to be used with separate signs, for example rigid card signs, or plastic signs, or flexible signs held in a rigid sign holder. For example, some sign holders comprise a sheet of transparent polymer, folded in the centre to form a double layer of transparent polymer such that a flexible paper or card sign can be positioned between the layers of transparent polymer to form a rigid sign. The flexible paper or card can then be replaced to alter the sign as and when required.

In embodiments of the invention the sign mounting may further comprise a sign holder integrally formed with the body. That is, a sign mounting, such as a rigid transparent sleeve as described above, may be integrally formed with the body of the sign mounting. Any suitable sign mounting may be integrally formed with the body. Suitable sign holders will be immediately apparent to the person skilled in the art.

The present invention also provides a sign kit comprising:

a barrier post having at least one shim formed at or near an upper end;

a sign mounting as described above; and a sign holder.

The sign holder may be formed integrally as part of the sign mounting or may be removably attached to the sign mounting as described above. The barrier post may have the at least one shim formed integrally with the post or the barrier post may have a removable cap formed at or near an upper end on which the shim is formed. In use, the sign mounting will be mounted on the shim of the barrier post, as described above. If necessary, the sign holder will be attached to the sign mounting using mounting means, as discussed above. In this manner, the sign kit of the present invention can be utilised to display a sign at or near the top of a barrier post. The sign mounting of the sign mounting kit may have any feature discussed above.

Further features and advantages of the present invention will be apparent from the preferred embodiment shown in the Figures and described below.

DRAWINGS

Two embodiments of sign mountings 1 according to the present invention are shown in the Figures. A first embodiment is shown in FIGS. 1 and 2 and a second embodiment is shown in FIGS. 3 to 5.

Figure 1:
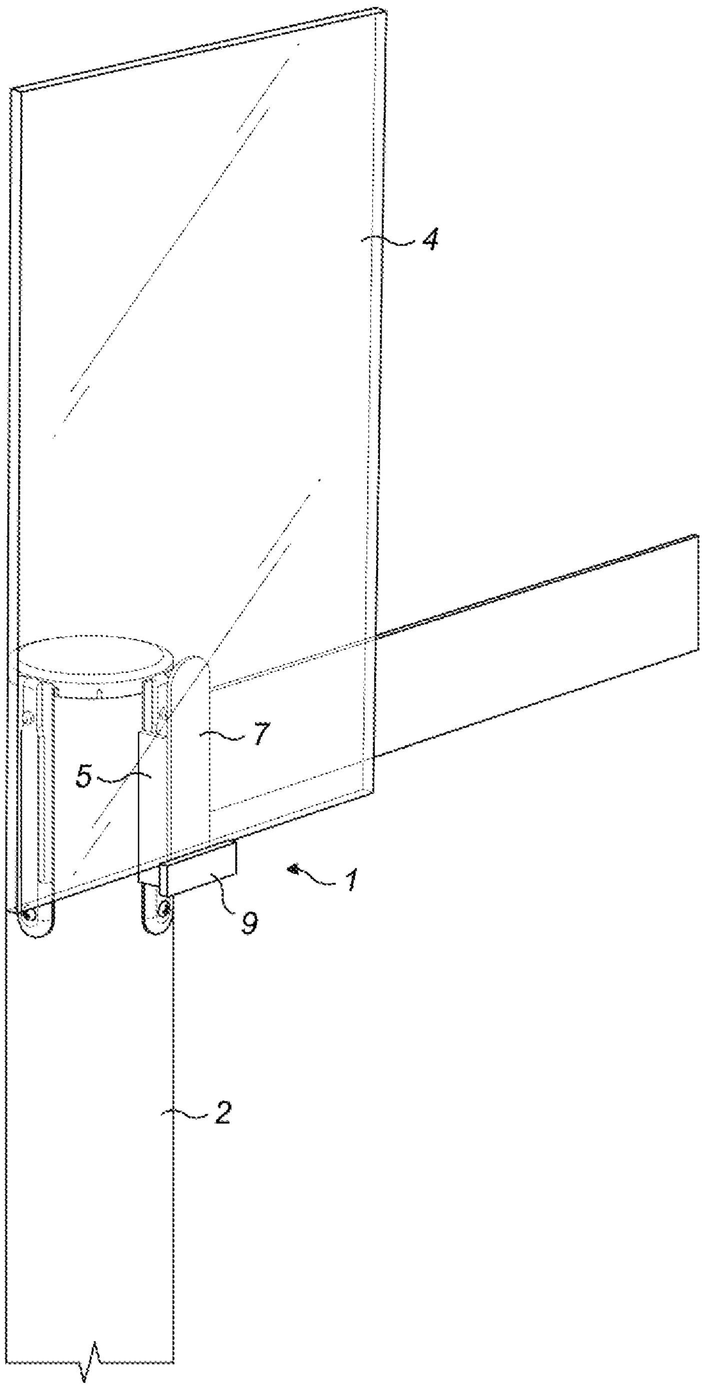
FIG. 1 is a first image of a first embodiment of a sign mounting according to the present invention.
Figure 2:
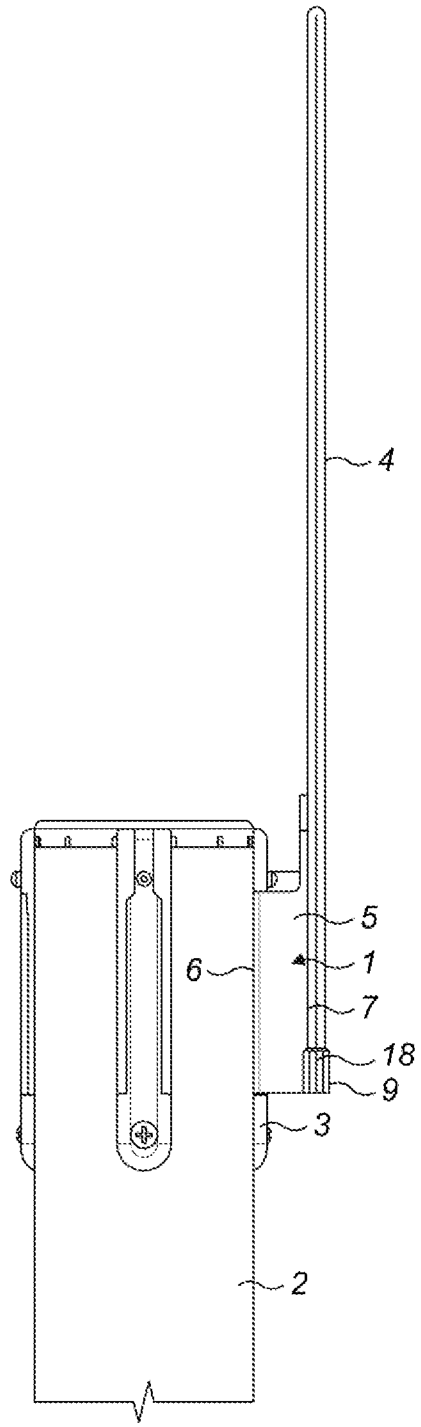
FIG. 2 is a second image of the embodiment of FIG. 1.

The sign mounting 1 of FIGS. 1 and 2 is shown mounted on a spline 3 of a barrier post 2. The sign mounting 1 of FIGS. 3 to 5 is shown in isolation in FIG. 3 and mounted on a spline 3 of a barrier post 2 in FIGS. 4 and 5. The barrier post 2 is a conventional barrier post with splines 3 for attaching extendable barrier tape, as might be found in many existing retail, hospitality, and travel venues. The features of the sign mounting 1 of FIGS. 1 and 2 are substantially the same as the features of the sign mounting 1 of FIGS. 3 to 5. Therefore, unless explicitly or implicitly described otherwise, the description set out below refers to both the sign mounting of FIGS. 1 and 2 and the sign mounting of FIGS. 3 to 5.

A rigid transparent polymer sign holder 4 is attached to the sign mounting 1. The sign holder 4 consists of a folded sheet of transparent polymer in which a paper or card sign (not shown) can be held. The sign mounting 1 has a body 5 having an inner side 6 and an outer side 7. A channel 8 is formed on the inner side 6. The sign holder 4 is mounted against the outer side 7 of the body 5. A lower edge the sign holder 4 is mounted in a slot 18 formed in an upper side of an outwardly protruding bar 9 formed at a lower end of the outer side 7 of the body 5. An inner side of the sign holder 4 is adhered to the outer side 7 of the body 5 by means of two adhesive pads 10 positioned therebetween.

Figure 3:
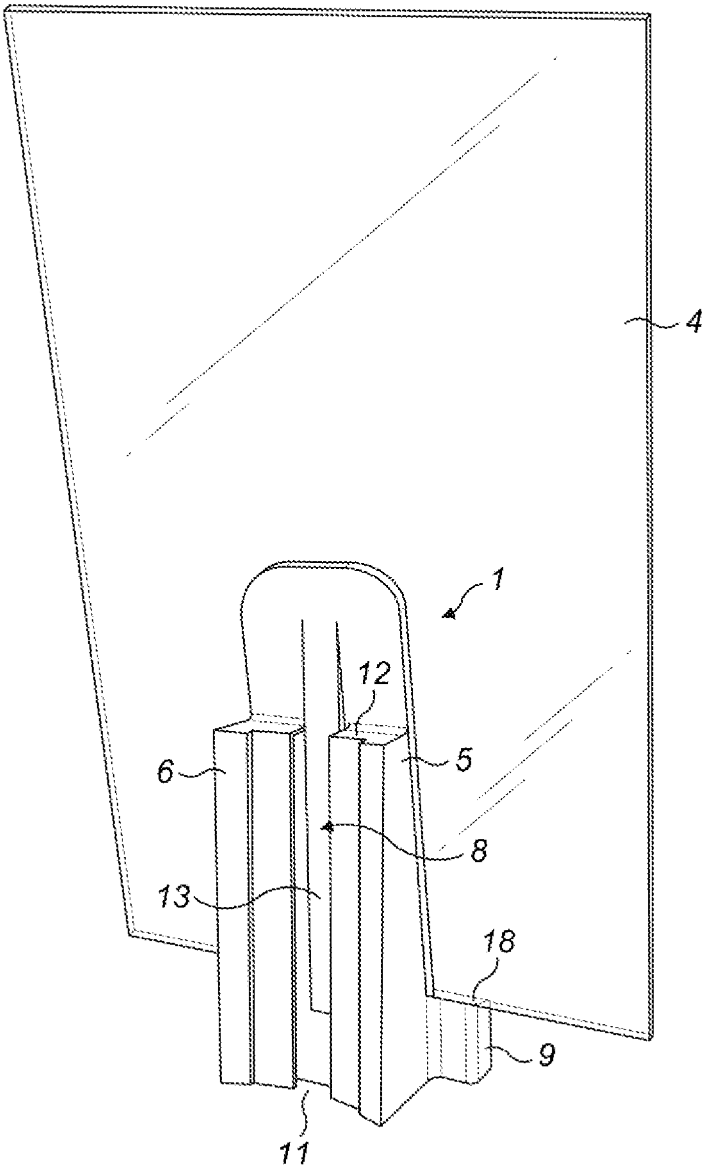
FIG. 3 is a second image of a first embodiment of a sign mounting according to the present invention.
Figure 4:
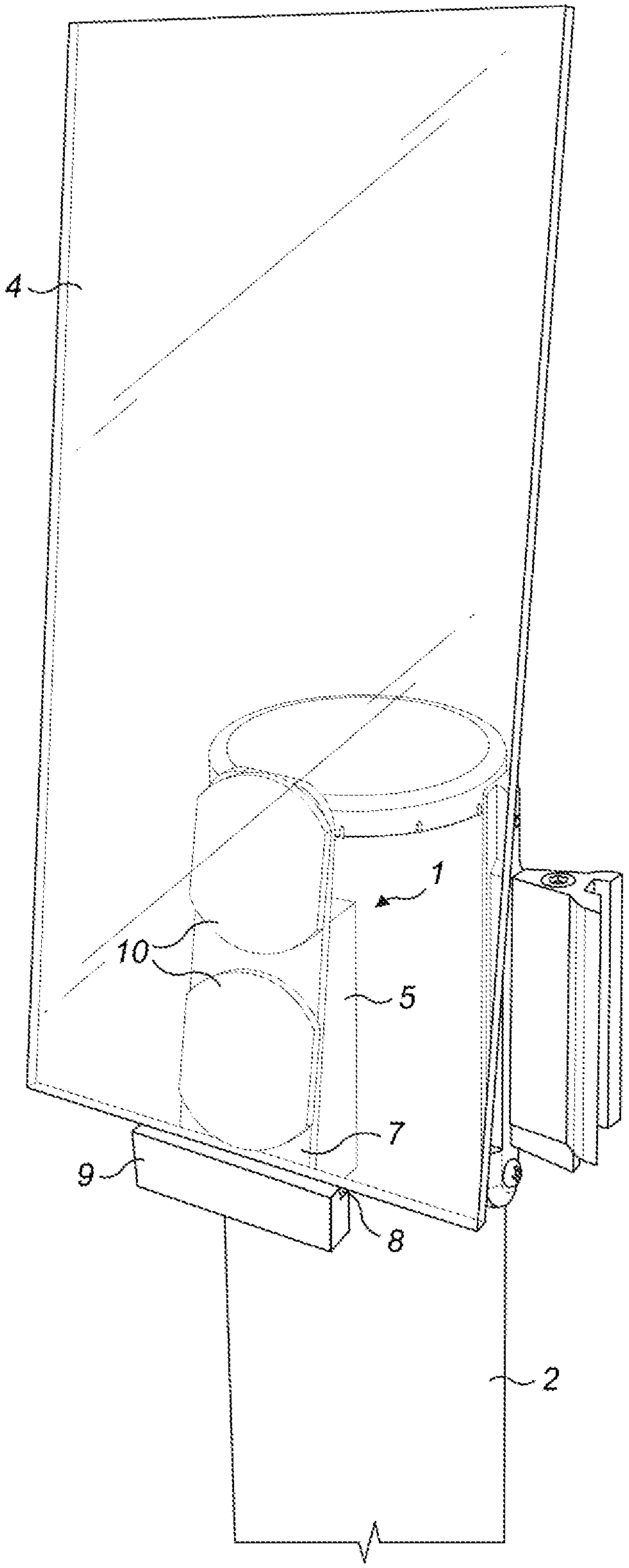
FIG. 4 is a second image of the embodiment of FIG. 3.
Figure 5:
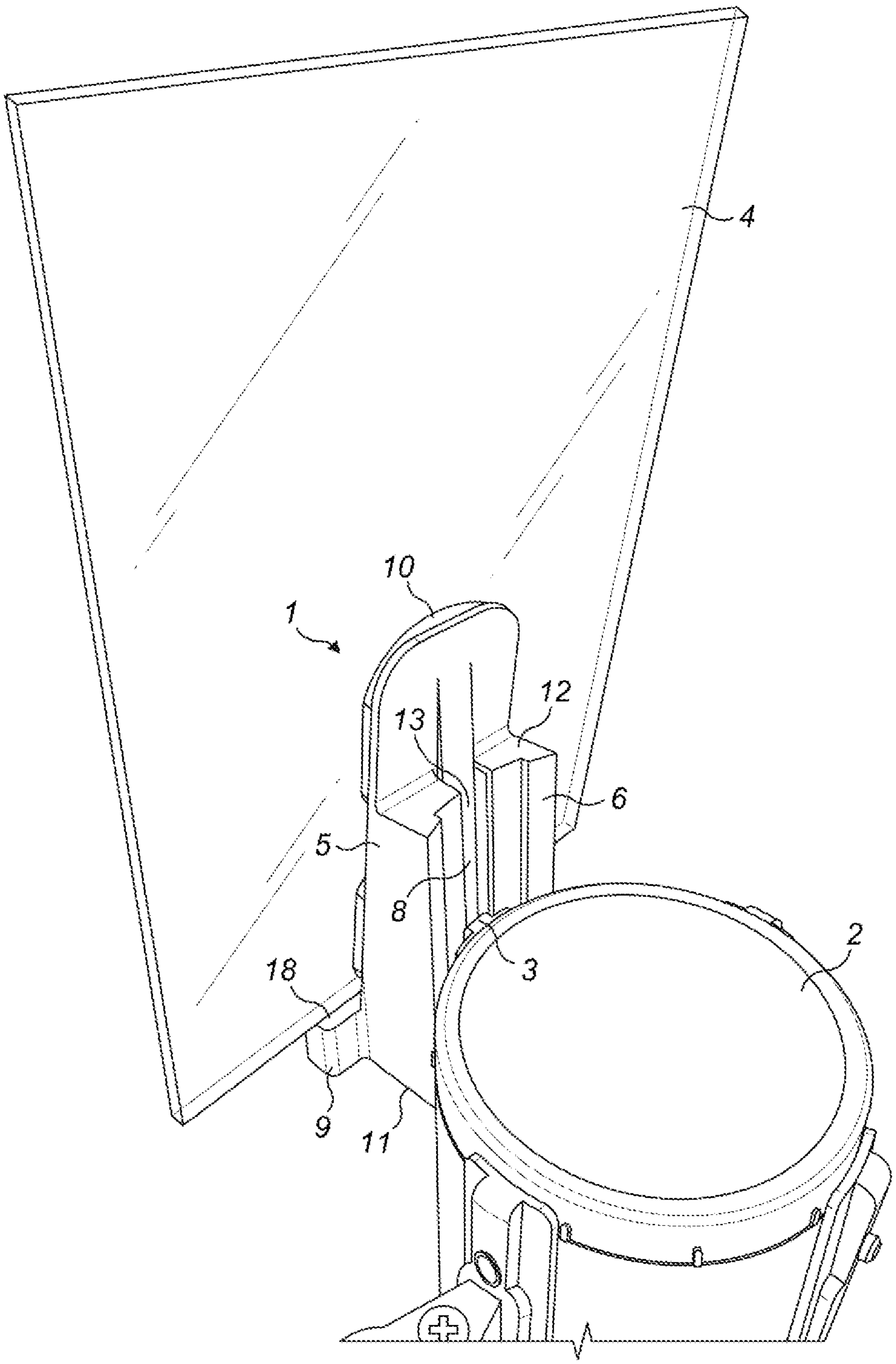
FIG. 5 is a third image of the embodiment of FIG. 3.

The channel 8 of the sign mounting 1 is best seen in FIGS. 3 and 5. The channel 8 is open at a lower end 11 and closed at an upper end 12 and has a relatively narrow vertical opening 13 at an inner side extending from the lower end 11 to the upper end 12 for the spline 3 of the barrier post 2 to extend through. The channel 8 has a relatively wider inner portion extending laterally beyond the opening 13 on each side of the vertical opening 13 within which the spline 3 can be positioned. As can be seen in the Figures the channel 8 is closed at the upper end in that the relatively wider inner portion has a wall of the body extending at least partially thereover such that the spline 3 cannot be moved upwards beyond the upper end 12 of the channel 8. It is not necessary for the upper end of the channel to be completely covered, rather a cover that partially extends over the relatively wider inner portion is sufficient to close the upper end 12 of the channel 8 as the spline 3 cannot pass beyond the upper end 12 of the channel 8. The channel 8 is open at is lower end 11 such that the spline can be inserted into the channel 8 at its lower end 11.

The sign mounting 1 is formed as a unitary moulded body from an injection moulded polymer.

The outer side 7 of the body 5 of the embodiment of FIGS. 1 and 2 is substantially vertical such that the sign holder 4 is also oriented substantially vertically. The outer side 7 of the body 5 of the embodiment of FIGS. 3 to 5 is angled between 10° and 20° away from vertical. As a result, the sign holder 4, which is held parallel to the outer side 7 of the body 5, is also angled between 10° and 20° away from vertical. This is the only substantive difference between the two embodiments.

It is to be understood that the description of the embodiments shown in the Figures is solely to illustrate two examples of the present invention and is not intended to be limiting on the scope of the application. The scope of the application is defined in the claims. Unless otherwise indicated by context or in the claims any feature of the embodiments set out above and described in the Figures may be combined in isolation with any other feature of the invention.

The invention claimed is:

1. A sign mounting for a barrier post comprising:

a body having an inner side for positioning against a barrier post and an outer side for supporting a sign; and a mounting channel formed on the inner side of the body; wherein, the mounting channel is open at a lower end and closed at an upper end and has:

a relatively narrow vertical opening at an inner side extending from the lower end to the upper end fora spline to extend through;

a relatively wider inner portion extending laterally beyond the opening on each side of the vertical opening within which a spline can be positioned, wherein a sign mounting means is formed on the outer side of the body, wherein the sign mounting means comprises an outwardly protruding bar for supporting a lower edge of the sign, wherein one or more adhesive pads are provided on the outer side of the body, and wherein the one or more adhesive pads are positioned directly above the outwardly protruding bar such that the lower edge of the sign may be supported by the outwardly protruding bar and an inner side of the sign is adhered to the sign mounting by means of the one or more adhesive pads.

2. A sign mounting according to claim 1, wherein the outwardly protruding bar comprises a channel formed on an upper side in which the lower edge of the sign may be positioned.

3. A sign mounting according to claim 1, wherein the outer side of the body is vertical.

4. A sign mounting according to claim 1, wherein the outer side of the body is angled between 10° and 20° away from vertical.

5. A sign mounting according to claim 1, further comprising a sign holder formed integrally with the body of the sign mounting.

6. A sign mounting according to claim 5, wherein the sign holder comprises a rigid transparent sleeve in which a sign can be mounted.

7. A sign kit comprising:

a barrier post having at least one shim formed at or near an upper end;

a sign mounting according to claim 1; and a sign holder.

8. A sign kit comprising:

a barrier post having at least one shim formed at or near an upper end;

a sign mounting according to claim 5.

* * * * *